United States Patent

[11] 3,527,168

| [72] | Inventors | Richard M. McCurdy<br>East Oakdale Township, Washington County, Minn.;<br>Norman G. Carlson, White Bear Lake Township, Ramsey County, Minnesota;<br>William S. Friedlander, Hudson, Wisconsin |
|---|---|---|
| [21] | Appl. No. | 73,929 |
| [22] | Filed | Dec. 5, 1960 |
| [45] | Patented | Sept. 8, 1970 |
| [73] | Assignee | Minnesota Mining and Manufacturing Company<br>St. Paul, Minnesota<br>a corporation of Delaware |

[54] SOLID PROPELLANT GRAIN CONTAINING METAL MACROCAPSULES OF FUEL AND OXIDIZER
14 Claims, 6 Drawing Figs.
[52] U.S. Cl. ................................................ 102/101,
102/102, 149/2, 149/7, 149/8, 149/19, 149/44, 149/74
[51] Int. Cl. ............................................. F42b 5/16, F42b 9/14
[50] Field of Search ................................................ 52/0.5,
102/98, 28, 101, 102; 149/14—19, 2, 3, 37—44, 74; 249/8, 7

[56] References Cited
UNITED STATES PATENTS

| 2,802,332 | 8/1957 | Orsino | 52/0.5(S)UX |
| 2,959,001 | 11/1960 | Porter | 52/0.5(S)UX |
| 2,960,935 | 11/1960 | Colpitts | 52/0.5(S)UX |
| 2,970,898 | 2/1961 | Fox | 52/0.5(S) |

Primary Examiner—Benjamin R. Padgett
Attorneys—Frank A. Steldt and Donald C. Gipple 1. A solid composite propellant grain for rocket motors comprising a binder selected from the class consisting of a rubber and a non-brittle resin and, integrally bound in said binder, a multiplicity of individual impermeable metal walled macrocapsules, the contents of said macrocapsules being selected from the class consisting of propellant oxidizers and propellant fuels, the metal walls of said macrocapsules being selected from the class consisting of aluminum, magnesium, zirconium and beryllium.

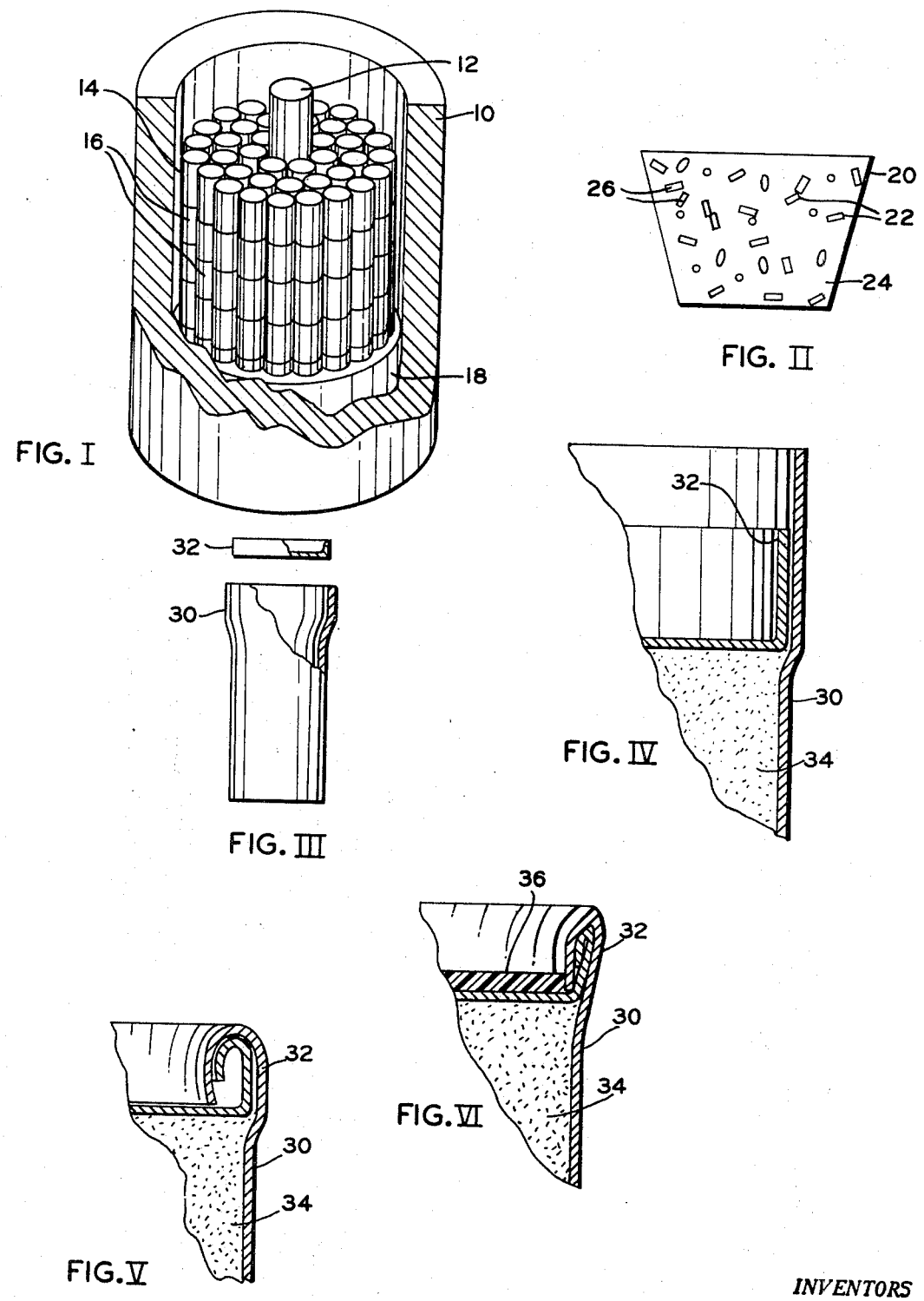

SOLID PROPELLANT GRAIN CONTAINING METAL MACROCAPSULES OF FUEL AND OXIDIZER

This invention relates to rocket propulsion means and more particularly to fuel charges for solid composite fuel rockets.

Propulsion units designed to be used for solid propellants ordinarily comprise a combustion chamber having a nozzle at the end thereof, a charge of solid propellant within the chamber, and a means for igniting the charge. The propellant in the chamber of this type of motor is ordinarily a coherent mass of solid combustible material (*i.e.* the propellant grain) which, when ignited, generates gas which escapes at high velocity through the nozzle, thereby producing thrust. These grains have heretofore ordinarily comprised a continuous phase of a solid oxidizable organic fuel binder containing dispersed therein a solid oxidizing agent sufficient in amount to provide enough oxygen to consume the entire quantity of fuel. In certain cases additional solid fuels, such as powdered metals, and gas formers, such as hydrazinium azide, hydrazinium azide hydrazinate, carbohydrazide and triaminoguanidine are also added.

Recently there has been considerable research with the object of developing high energy solid rocket systems. As a consequence, a number of new oxidizers, fuels and gas formers have been found which in theory make possible the production of rocket motors of vastly increased thrust. In fact, however, many of the most energetic of these new constituents have been unavailable due to their incompatibility in the environment in which they would have to be used. Thus, some are volatile liquids or even gases which would evaporate from the propellant during fabrication or storage, often with the release of toxic or corrosive fumes; others would react violently with atmospheric moisture or other constituents of the motor; others would increase the pressure exponent of the propellant in which they were used to the point that failure of the rocket due to overpressure therein would be inevitable; and still others would decrease the strength of organic polymeric fuel binders surrounding them to an unacceptable degree, or make it impossible to cure said binders. These constituents can be considered to be normally incompatible.

It is an object of the present invention to provide novel solid composite propellants in which normally incompatible constituents may be used. It is another object of the present invention to provide novel solid composite propellants of vastly increased thrust. Additional objects will be apparent to those skilled in the art from reading the specification which follows.

In accordance with the above and other objects of the invention, it has been found that a useful rocket propulsion unit is produced by dividing the constituents thereof into a continuous phase and a number of discontinuous phases, said discontinuous phases being confined in a multiplicity of macrocapsules having impermeable metallic external layers and said continuous phase (*i.e.* binder) surrounding and being intimately adhered to said macrocapsules, said metallic layers being unreactive toward the propellant constituents at temperatures below firing temperatures but forming fuel for the motor during firing. Thus high performance but normally incompatible constituents may be utilized in solid propellant grains by confining them in metallic capsules which rupture to release their contents during the burning of the grain and are themselves consumed, providing additional fuel for the rocket. Metals have previously been added in powdered form as fuels in conventional propellant grains, but in powdered form they tend to decrease the fluidity and consequently intensify the serious difficulties of casting the grain without voids. In the propellant grains of the present invention, the same amount of metal may be added in the form of capsule walls without any noticeable effect on the viscosity of the mix, since the total surface area of the capsule walls compared to that of an equal weight of metal powder is quite small.

The solid composite propellant grains of the invention can be cast by any convenient method which results in embedding metallic capsules in the viscous liquid continuous phase of the propellant composition in a suitably shaped mold and curing the said continuous phase until it becomes solid. In grains in which a large percentage of the constituents are encapsulated, it may be desirable to pack the capsules in the mold and then introduce the continuous liquid phase in such a way that no voids are formed, *e.g.* by admitting it from the bottom of the mold. In such grains, when cured, each capsule will be touching other capsules around it. The interstices being filled with the solidified continuous phase. In other grains in which fewer capsules are required, they may each be completely surrounded by the continuous phase.

The invention and the construction of embodiments thereof are more particularly described with reference to the accompanying drawings, wherein:

FIG. I is a perspective view of a partially completed cylindrical cored propellant grain in the mold in which it is cast, the outer portion of the mold being partially in cross section and only part of the viscous liquid which will form the continuous phase of the grain having been added. In this grain the capsules are packed in a geometrically ordered manner, the interstices between them being filled with the continuous phase of the propellant. FIG. II is a cross sectional view on a diameter of an end burning cast grain of truncated cone configuration comprised of randomly oriented capsules each completely surrounded by the continuous phase of the propellant except where two happen to touch by chance. FIGS. III—VI illustrate various steps in the manufacture of a type of capsule particularly preferred for the purposes of the invention.

Referring to the drawings, in FIG. I, there is shown in perspective view and in partial cross-section on the diameter thereof, a cylindrical outer mold 10 for a solid rocket motor grain, and centrally located therein, a mandrel 12 which acts as a mold to form a central core in the grain. A solid rocket motor grain 14 is shown partially fabricated in the mold. It is comprised of a multiplicity of geometrically ordered roughly cylindrical capsules 16 which are packed in contact with one another and which contain components of the propellant composition, and the initially liquid continuous phase, or binder, 18 which is shown only partially added but which, when it is all added, completely covers and surrounds the capsules. This continuous phase is ultimately cured to a solid. The central mandrel 12 will ordinarily be removed once the curing of the continuous phase has been completed and the outer mold 10 may be removed or, as in a case-bonded grain, it may be left in place during firing.

In FIG. II there is shown in cross section on the diameter thereof an end burning cast grain of truncated cone configuration 20 containing a plurality of randomly oriented capsules 22 surrounded by the solid continuous phase 24. The capsules contain components 26 of the propellant composition and the metallic walls of the capsules are themselves consumed as fuel during firing of the grain.

In FIG. III are shown plan views, partially in cross section on a diameter thereof, of the body 30 and cap 32 of a metallic capsule construction of a configuration particularly suitable for the present invention. The length of this capsule from the bottom to the neck is about 0.30 inches. Its diameter is about 0.15 inches below the neck and it has a side wall thickness of about 0.002 inches. The bottom of the capsule is somewhat thicker than the wall owing to the nature of the drawing operation (explained below).

The capsule body and cap may be prepared from commercial four mil (.004 inch) dead soft 1.2 percent manganese alloy aluminum sheeting. The body is drawn from a 0.450 inch diameter disc cut from the sheet metal, which is put through eight successive drawing operations and one trimming operation in a suitable press. For making small quantities of capsules a "kick press" is satisfactory. The dimensional changes achieved in each drawing operation are summarized in the following table:

| Operation | Male die diameter, inches | Male die length from tip to shoulder, inches | Female die opening diameter, inches |
| --- | --- | --- | --- |
| First draw | 0.3115 |  | 0.319 |
| Second draw | 0.265 |  | 0.272 |
| Third draw | 0.2385 |  | 0.245 |
| Fourth draw | 0.215 |  | 0.221 |
| Fifth draw | 0.1935 |  | 0.199 |
| Sixth draw | 0.175 |  | 0.180 |
| Seventh draw |  |  | 0.162 |
| Seventh draw, first section | 0.1575 | 0.1575 |  |
| Seventh draw, second section | 0.175 |  |  |
| Eighth draw |  |  | 0.154 |
| Eighth draw, first section | 0.150 | 0.300 |  |
| Eighth draw, second section | 0.1575 |  |  |
| Trim at shoulder between second and third sections 0.162 | | | |
| Eighth draw, first section | 0.150 | 0.300 |  |
| Eighth draw, second section | 0.1575 | 0.340 |  |
| Eighth draw, third section | 0.162 |  |  |

The cap is formed from a 0.250 inch diameter disc in a single drawing and trimming operation. The male die diameter in this operation is 0.155 inches in the first section, and 0.160 inches in the second section; the male die length from the top to the shoulder is .047 inches and the female die opening diameter is 0.160 inches. The excess metal is trimmed off at the end of the press stroke at the locus of contact between the female die opening and the second section of the male die.

The capsule body 30 and cap 32 are next degreased, (e.g. in a Soxhlet extractor with trichloroethylene solvent), filled with the desired components 34 and assembled in the manner shown in FIG. IV, which is a cross section of the area of the capsule body and cap also shown in cross section in FIG. III (as are FIGS. V and IV). This assembly is conveniently accomplished in the press ("kick press") using a suitable assembly die for the cap and nest for the body.

The lips of the body and cap are then curled inward as shown in FIG. V. This is often accomplished with the more malleable metals without causing any pleating or wrinkling of the portions of the cap and body which are turned over in the curling operation, although some pleating is not deleterious if a tight seal between the two is achieved. The capsule body is placed in a curling nest which holds the lower portion of the body securely but which does not admit the shoulder thereof. On the surface of the curling die is an annular groove of curved cross section. When the die is brought down upon the capsule body and cap held in the nest, the outer curved surface of this groove contacts the top of the body evenly around its entire circumference and urges it inwardly, thus also forcing the lip of the cap inward. An additional step is necessary to complete the curling, a second curling die being used. The completely curled body and cap are shown in cross section in FIG. V.

The capsule is then placed in a swaging nest which has a tapered upper section and a cylindrical lower section for holding the body of the capsule securely but which does not admit its shoulder. A swaging tool, which has a truncated conical head designed to be received by the tapered section of the die, is then used to flatten the curled edges of the capsule body and cap outward against the tapered wall of the die as shown in FIG. VI. A drop of a sealer (36 in FIG. VI), such as an epoxy resin, is then placed in the top and cured to complete the seal. Alternatively this seal may be accomplished by ultrasonic welding techniques.

It is desirable and often essential to verify the seal in the individual capsules before they are cast in rocket grains. This may be done by storing the capsules under controlled conditions of temperature and pressure for a time sufficient to allow a material amount of the contents to escape from the imperfectly sealed capsules and then removing them by flotation in a liquid having a slightly lower specific gravity than the sealed capsules.

The continuous phase used in the encapsulated grains of the present invention preferably is an initially relatively low viscosity liquid (for ease of loading without formation of voids) which cures to a rubber or non-brittle resin at a relatively low temperature, preferably at room temperature. Once cured it should adhere well to the metallic capsules and burn with a relatively low burning rate pressure exponent. Usually the continuous phase will sustain its own combustion during firing. It is generally based upon elastomeric polymers such as thiokol-type rubber, natural rubber, GRS synthetic rubbers, cured butadiene:acrylic acid copolymers, cured polyesters, epoxy resin copolymers, and the like. Any rubber or rubber-like substance which is capable of being oxidized can be employed for the purpose (thus serving as part of the fuel when the grain is burned). In addition, other constituents compatible therewith may be blended into the continuous phase, (e.g. which would neither evaporate during fabrication or storage, nor interfere with the polymeric material present, etc.). The continuous phase may be thought of as a binder for the grain and is sometimes so designated herein.

As illustrative of the relatively incompatible solid rocket grain constituents, oxidizers such as the following can be listed:

Tetranitromethane. A volatile liquid, a skin and lung irritant, which tends to evaporate from the binder. If it is incorporated in a conventional solid rocket grain, using great care to minimize the previously mentioned difficulties, the burning rate exponent of the grain is generally so high that the rocket casing is ruptured by the internal pressure of the rocket.

Nitronium perchlorate. A solid which cannot be used in conventional solid rocket grains because of its extreme reactivity with water and other oxidizable materials.

Nitrogen tetroxide. A volatile liquid or gas which has an irritating odor, which boils at about 21°C., and which is a deadly poison.

Chlorine heptoxide. A highly volatile, oily liquid which explodes violently upon concussion or in contact with a flame or iodine and which is extremely reactive with water and oxidizable substances.

Tetrafluorohydrazine. A low boiling liquid.

Chlorine Trifluoride. A colorless gas having a suffocating odor which attacks the lungs at once and which is extremely reactive. Glass wool and organic matter burst into flame on contact even with dilute vapors and it reacts explosively with water.

Among the difficult to handle (i.e. relatively incompatible) materials which are potential solid rocket grain fuels and gas formers are:

Hydrazine. A volatile colorless oily liquid which fumes in air. It is a violent poison which causes delayed eye irritation. Rocket binders generally cannot be cured in the presence of hydrazine.

Metal hydrides. Variously liquids and solids, they react with atmospheric moisture.

Unsymmetrical dimethylhydrazine. A flammable, hydroscopic, mobile liquid which fumes in air.

The oxidizable metals preferred for use in the capsules include aluminum, magnesium, zirconium and beryllium. Compositions in which minor amounts of alloying materials are added to these elements are also well suited for use in the capsules and references to the elements when used in this specification in connection with the capsules are intended to include such alloys. The characteristics of the particular metal being used must be taken into consideration in the fabrication and loading of the capsules and later preparation of the grain. Thus less ductile metals may require different fabrication techniques, other metals may require surface coatings, special environments during fabrication, and/or alloying to reduce their reactivity, etc. The particular metal used in capsules in any grain must be unreactive with respect to both the capsule contents and the continuous phase surrounding it, or must be surface treated to render it so. The particularly preferred metal for the purpose of the invention is aluminum due to its ready availability, its malleability and the fact that no particular measures need to be taken to protect it from surface reactions.

The design of any particular solid rocket grain according to the present invention will depend upon a number of factors, including, for example, grain size, desired specific impulse, relative availability of raw materials, hazards and difficulties of fabrication and storage, need for relatively good contact between the constituents to achieve proper combustion, specific gravity considerations, etc. The latitude afforded is, however, relatively great. Thus, the oxidizer alone may be encapsulated with the remaining constituents (except for the metal in the capsule walls which acts as additional fuel) in the continuous phase. Alternatively, the oxidizer and fuel may both be encapsulated, but in separate capsules; the oxidizer and gas former may be encapsulated in separate capsules; or the fuel may be encapsulated. It is also possible to mix two or more constituents in the same capsules (e.g. in order to obtain smoother firing due to more intimate contact between the constituents) provided that strict care is paid to the compatibility thereof. The oxidizer and additional metallic fuel may for example, be mixed and loaded into the same capsules.

In each case in preparing grains according to the present invention, it is essential that sufficient binder be provided to fill the voids between the capsules and provide a unitary grain of reasonable strength. It has been found, however, that it is not necessary to separate (i.e. insulate) the capsules from one another in order to avoid worm-holing in the grain and consequent over-pressure due to the additional burning surface afforded thereby. Thus the major part of the total grain may be either in the capsule walls or contained by the capsules (e.g. see FIG. I in the drawings). In such grains the continuous phase may make up only 20 percent or less of the total grain weight, the remaining 80 percent or more being capsule walls and contents. Also, relatively high internal volume to wall volume ratios are feasible even in the smaller capsules, i.e. 10:1 or greater but preferably not less than 15:1. Thus solid rocket grains can be fabricated of which the major part is made up of high performance constituents which cannot be used in conventional grains.

A wide variety of capsule constructions are feasible in the present invention. In general the capsules are prepared from standard impermeable metal fabrications or blanks such as sheets, rolls, tubes, of oxidizible metals. Thus satisfactory capsules can be prepared from lengths of metal tubing which can be sealed by crimping the ends and applying cement to the crimped area. It has been found that the thickness of these blanks is advantageously at least about .002 inches even for use in preparing the smaller capsules, since thinner blanks are too fragile for easy handling and working. Taking into account relative difficulties of fabrication and of desirable internal volume to wall volume ratios, a practical minimum of about .02 milliliter internal volume is indicated for the capsules. In larger capsules, e.g. those suitable for use in multiton rocket grains, as well as in smaller capsules which are capable of containing gases which exert considerable pressures on the capsules, wall thicknesses of up to 0.020 inch or more may be used. The larger capsules may range in internal volume up to one liter, or in some cases even larger, and are conveniently fabricated by the methods commonly used for preparing sheet metal containers such as beer containers. Based on probabilities of a capsule being completely burned before it can be blown out the nozzle of the rocket and of desirable stoichiometry, it is preferred that the ratio of the total chamber volume to the volume of an individual capsule be at least 1000.

The impermeability of the capsules of the invention is essential. This impermeability may be conveniently checked in evaluating a new type of capsule by loading the capsules to be tested with lithium aluminum hydride and then submerging them in concentrated aqueous hydrazine. If no gas has been evolved after 48 hours at 100° F., it may reasonably be assumed that the capsule construction is feasible from this standpoint.

In order more clearly to disclose the nature of the present invention, a number of specific examples in accordance with the invention will now be described. It should be understood, however, that this is done solely by way of illustration and is intended neither to delineate the scope of the invention nor limit the ambit of the appended claims. All parts are by weight unless otherwise specified. The following disclosures regarding constituents and procedures apply generally to the examples unless otherwise specifically noted.

CONSTITUENTS

The polyester utilized in the examples is liquid polydiethylene glycol adipate having approximately the following characteristics:

| | |
|---|---|
| Inherent viscosity in acetone | .08 |
| Number average degree of polymerization, $\overline{X}_n$ | 24 |
| Molecular Weight, $\overline{M}_n$ | 2,500 |
| Free carboxyl groups per molecule, average | 2.5 |
| Acid concentration, milliequivalents per gram | 0.966 |

The curing agent used is N,N'−bis−1,2−ethylenisosebacamide whic may be prepared as follows:

A solution of about 95.6 parts of isosebacoyl dichloride prepared from "isosebacic acid" (a product of the U.S. Industrial Chemical Company consisting of 72−80 percent of 2−ethyl−suberic acid, 12−18 percent of 2,5−diethyladipic acid and 6−10 percent of n−sebacic acid) dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately one part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for one hour, the sodium hydroxide is removed by filtration and the ether removed from the filtrate under reduced pressure. The resulting reaction product, N,N'−bis−1,2−ethylenisosebacamide remains as a water-white liquid. The yield is 93 percent of theoretical. When subjected to analysis the product is found to contain 10.8 percent nitrogen and 33.3 percent azirane radical as compared with the calculated values of 11.1 percent and 33.3 percent respectively.

FORMULATIONS

The continuous phases are prepared in the conventional way by first pouring the polyester into a small sigma blade mixer (capacity about one pint) followed by the aluminum powder, if used, and the ammonium perchlorate. After mixing under vacuum, the N,N'−bis−1,2−ethylenisosebacamide is added followed by further mixing.

The epoxy cement used for sealing capsules, etc. is prepared by mixing 100 parts of "Epon 828" (a liquid condensation polymer of epichlorohydrin and Bisphenol A which has an epoxide equivalent of 175—210, an average molecular weight of 350—400 and a viscosity at 25°C. in the range of from 5000—15,000 centipoises and which is available commercially from the Shell Chemical Co. of New York) and ten parts of triethylene tetramine.

MOTOR PREPARATIONS

The truncated cone end burning grains which are casebonded in their molds are prepared as follows:

The mold is a maple wood cylinder having a diameter of three inches and a height of two inches which has therein a truncated cone-shaped cavity 1½" deep and having an outer circular face 2½" in diameter and an inner circular face 1½"

in diameter. The mold inhibits all of the surfaces of the grain except the open circular face thereof, since in these test motors it remains in place during firing of the motor.

The grain is prepared by placing sufficient of the dry capsules in the mold cavity to form a single layer and covering the layer of capsules with binder. This procedure is repeated until the mold cavity has been essentially filled, the capsules being submerged in binder. The capsules are randomly oriented in this grain, each being surrounded by binder. The binder is then allowed to cure at room temperature. A cure time of three days is ample for the continuous phases utilized in the examples.

The cylindrical end burning propellant grains which are case-bonded in their molds are prepared as follows:

The molds for the propellant grain comprise an outer methyl methacrylate tube about 2 1/10" high and having an internal diameter of 1¾" and a butyrate tube ⅜" in diameter and about 2 1/10" high which is located centrally inside the outer tube. The grain is fabricated in the annular space between the inner and outer tubes, both tubes remaining in place during firing of the motor to act as inhibitors for the longitudinal faces thereof.

The internal-burning, cored cylindrical propellant grains are prepared as follows:

The outer mold for the grain is a tube of alumina-filled epoxy resin. This mold, which remains bonded to the grains during firing (thereby inhibiting the outer cylindrical surfaces thereof, is 2.6 inches in internal diameter, 3.0 inches deep and has a wall thickness of approximately 0.25 inches. A mandrel of polytetrafluoroethylene which is 1.0 inch in diameter is utilized during casting and curing of the grain to form a central core in each grain, but is removed prior to firing. The resulting grain configuration burns on the end and internal core surfaces.

MOTOR FIRINGS

The ignition system used in all of the firings consists of a resistance wire cemented to the burning surface of the cured grain with an uncured composite propellant consisting of 69 parts of ammonium perchlorate, 13.7 parts of a liquid copolymer of butadiene and acrylic acid, 13 percent of powdered aluminum and 4.3 parts of a liquid epoxy resin (based on epichlorohydrin and bisphenol A, having an epoxide equivalent of 180—200, an average molecular weight of 350-—400 and a viscosity of 25°C. of 9,000—18,000 centipoises and which is available from the Jones-Dabney Co. under the trade designation "Epi-Rez 510").

EXAMPLE 1

Burning strands containing stacked capsules.
The capsules are of the type disclosed in FIGS. III—VI of the drawings and in the accompanying descriptive matter in the specification. The composition of the continuous phase which is used to surround the capsules and fill the control strands is as follows:

| | |
|---|---|
| $NH_4ClO_4$ | 61.3 |
| Polyester | 28.3 |
| Al (powdered) | 5.66 |
| Curing agent | 4.72 |

The capsule composition is as follows:

| | |
|---|---|
| Tetranitromethane | 86 |
| Al (capsule walls) | 14 |

The molds used in preparing the burning strands are tubes composed of wax-impregnated paper which have inside diameters of three-sixteenth inch and are six inches in length. The strands containing the capsules are prepared by stacking 15 filled and capped capsules together inside the tube, thus forming a rod of capsules about 4½" in length by 0.15 inch in diameter. These rods are placed centrally in tubes and the surrounding voids are then filled by forcing the liquid continuous phase into the bottom of the tube through a small orifice in order to avoid the entrapment of air. The ratio of binder to capsule weight in the strands is about 51 percent to 49 percent. Control strands are prepared in the same way except that no capsules are included in the tubes. Both sets of strands are allowed to cure for three days at room temperature, i.e. at approximately 70°F. The strands are inhibited by the tubes in which they have been cast.

Burning tests run under pressure on both types of strands (using an Atlantic Research Corporation strand burner) indicate that, while the burning rate of the strands containing capsules is about twice that of the control capsules, the burning rate exponents of the two types are approximately equal. The values measured are, for the strands containing capsules burning rate approximately 0.25 inch/second and burning rate exponent 0.19; for the control strands, burning rate approximately 0.15 inch/second and burning rate exponent 0.23. Thus the strand constuction containing the capsules is shown to make the extra energy of the tetranitromethane available but (unlike prior constructions in which tetranitromethane was used) does not lead to dangerous and unacceptable increases in the burning rate exponent.

EXAMPLE 2

Truncated conical end burning grains containing drawn and capped capsules.

The capsules are of the type disclosed in FIGS. III—VI of the drawings and in the accompanying descriptive matter in the specification. Liquid tetranitromethane is charged to the capsules using a hypodermic syringe. Several truncated conical end burning grains containing these capsules are prepared and fired. The results are summarized in the following table:

| | Overall composition (parts) | Grain weight, grams | Initial $K_n^4$ | Maximum pressure | Burning time, sec. | Remarks on firing |
|---|---|---|---|---|---|---|
| Grain designation: | | | | | | |
| 2a | Capsules | | 247 | 329 | | Smooth combustion. |
| | TNM,¹ 50.0 | | | | | |
| | Al, 6.1 | | | | | |
| | Continuous phase: | | | | | |
| | $NH_4ClO_4$, 32.9 | | | | | |
| | Polyester, 15.2 | | | | | |
| | Al (powd.), 3.2 | | | | | |
| | Curing agent, 2.6 | | | | | |
| 2b | Capsules | 120 | 307 | 777 | 5 | Slight popping sound. |
| | TNM, 42.0 | | | | | |
| | Al, 6.9 | | | | | |
| | Continuous phase: | | | | | |
| | $NH_4ClO_4$, 31.0 | | | | | |
| | Polyester, 14.4 | | | | | |
| | Al (powdered), 2.9 | | | | | |
| | Curing agent, 5.0 | | | | | |
| 2c | do | 115 | 353 | 612 | 6.8 | Do. |
| 2d | do | 122 | 468 | 794 | 7.0 | |

See footnotes at end of table.

| Overall composition (parts) | Grain weight, grams | Initial $K_n$[4] | Maximum pressure | Burning time, sec. | Remarks on firing |
|---|---|---|---|---|---|
| 2e ............do............ | 124 | 470 | 740 | 7.7 | Smooth sound, no popping. |
| 2f[2] ...... Capsules,[3] 50.0 ...... Continuous phase,[3] 69.1 | 119.1 | 470 | 1,770 | 3.4 | Fairly smooth sound. |
| 2g[2] ...... Capsules,[3] 50.0 ...... Continuous phase,[3] 70.2 | 120.2 | 456 | 1,610 | 3.3 | Do. |

[1] Tetranitromethane. The tetranitromethane-filled capsules are tested for a tight seal by heating them under vacuum for at least 12 hours, floating the entire batch in carbon tetrachloride and discarding those which float.
[2] In grains 2f and 2g after each addition of capsules and binder, the partially filled grain is subjected to reduced pressure and vibrated to eliminate faults in the grains.
[3] The capsules in grains 2f and 2g are composed of 85 parts of TNM and 15 parts of aluminum (capsule walls). The continuous phase is composed of 65.5 parts of ammonium perchlorate, 19.2 parts of polyester, 9.2 parts of curing agent and 6.1 parts of TEGDN (triethylene glycol dinitrate) which is added to increase the fluidity of the continuous phase before curing and increase its burning rate upon firing.
[4] Ratio of propellant burning surface to nozzle throat area.

The computed burning rates determined from the motor firings are about 2.5 times those of the binder alone, the pressure exponents being about the same as for the motors containing binder alone. This has been found to be true in various firings in which constituents (such as tetranitromethane) have been encapsulated which, when *not* encapsulated, cause dangerous increases in burning rate exponents. Thus the encapsulated systems make it feasible for the first time to include such constituents in solid rocket grains.

The results of firing a similar series of grains having the same truncated cone configuration are given in the following table. Grains containing capsules loaded with either solid or liquid oxidizing agents are included. The footnotes of the previous table apply here also:

The final composition of the motor (in grams) is as follows:

Continuous phase:
$NH_4ClO_4$ .................................. 43.4
Polyester ................................... 12.03
Al (powdered) .............................. 3.72
Curing agent ............................... 2.85

Tetranitromethane-filled capsules:
Tetranitromethane .......................... 22.8
Aluminum ................................... 5.98

Hydrazine-filled capsules:
Hydrazine .................................. 17.5
Aluminum ................................... 6.87

The grain is fired in a two inch diameter vented vessel.

| Composition, parts | Total weight, grams | Contents | Total weight, grams | Initial $K_n$ | Maximum pressure, (p.s.i.a.) |
|---|---|---|---|---|---|
| Grain designation: | | | | | |
| 2h ...... $NH_4ClO_4$, 60.0; Polyester, 22.4; TEGDN, 7.0; Al (powdered), 5.0; Curing agent, 5.6 | 77.3 | TNM | 51.1 | 401 | 1,359 |
| 2i ...... $NH_4ClO_4$, 60.0; Polyester, 16.8; TEGDN, 14.0; Al (powdered), 5.0; Curing agent, 4.2 | 67.2 | AP[1] | 61.0 | 190 | 850 |
| 2j ...... ......do...... | 46.1 | AP[1] | 60.1 | 215 | 710 |
| 2k ...... ......do...... | 52.0 | NP[2] | 56.0 | 173 | 1,190 |
| 2l ...... $NH_4ClO_4$, 70.0; Polyester, 24.9; Curing agent, 4.8; Carbon black, 0.3 | 48.7 | NP and Al[3] | 56.0 | 130 | 415 |

[1] Ammonium perchlorate—pressed into pellets the size and shape of the cavity in the capsule before inserting.
[2] Nitronium perchlorate—pressed into pellets the size and shape of the cavity in the capsule before inserting.
[3] Overall capsule composition is 58.3% nitronium perchlorate powder, 29.0% aluminum powder and 12.7% aluminum capsule walls.

*EXAMPLE 3*

Cylindrical end burning grain containing separate capsules filled with different constituents.

The capsules are of the type disclosed in FIGS. III—VI of the drawings and in the accompanying descriptive matter in the specification. 168 capsules filled with tetranitromethane and 217 capsules filled with hydrazine are used in the grain. The tetranitromethane-filled capsules are fabricated into 24 strands of seven capsules each by joining the top of one capsule to the bottom of the adjacent capsule with a drop of epoxy cement. Similarly, the hydrazine-filled capsules are fabricated into 31 strands of seven capsules each.

The motor is loaded by first introducing a layer of binder and then adding strands of capsules in concentric rings, alternating strands of tetranitromethane-filled and hydrazine-filled capsules in each ring. After all of the strands are in place the remainder of the binder is added completely submerging the strands. The binder is allowed to cure at room temperature (approximately 70°F.)

Although the nozzle fails during firing because of an overpressure, the propellant continues to burn at atmospheric pressure after the nozzle failure and all of the aluminum capsules are consumed.

*EXAMPLE 4*

Burning strands containing relatively long, non-segmented aluminum tubes loaded with gelled liquid components.

Individual strands are prepared which contain two thin walled aluminum tubes 5½" in length encapsulated in a continuous phase, one tube in each strand containing gelled tetranitromethane and the other containing hydrazine treated to render it viscous. The tubing used has a wall thickness of two mils and a diameter of ⅛". The tetranitromethane is gelled by adding 4 percent of colloidal silica (available under the trade designation "Cab-O-Sil" from Godfrey L. Cabot, Inc. of Boston, Mass.), forced into 5½" pieces of tubing and the ends thereof are sealed by crimping.

Similar 5½" lengths of tubing filled with hydrazine rendered viscous by the addition of four percent of a high molecular weight polyacrylamide powder (which is available commercially from the American Cyanamid Co. of New York, N.Y. under the trade name designated PAM200) are fabricated in the same way.

Strands for burning are prepared in a mold consisting of one half of a longitudinally divided polyethylene tube having an internal diameter of ⅜" as follows: One aluminum tube containing tetranitromethane and one containing hydrazine are placed in the mold, a liquid continuous phase mixture having the same composition as that used in Example 1 is poured over the aluminum tubes until they are submerged and the binder is allowed to cure for three days at room temperature. At the end of this time the cured strands are removed from the molds and their surfaces are inhibited by covering them with silicone grease.

Burning tests (run under pressure using an Atlantic Research Corporation strand burner) result in burning rate measurements of approximately 0.88 inch/second at 1000 psi for the aluminum tube-containing strands while the burning rate of the binder alone is 0.258 inches per second at 1000 psi. Visual observation of one such aluminum tube-containing strand burning in air indicates that as the flame front of the continuous phase reaches the capsules there is an audible pop, after which the capsules burn smoothly, with twin jets of flame piercing the enveloping flame of the binder propellant.

EXAMPLE 5

Truncated conical end burning grain containing capsules fabricated from aluminum tubing.

The capsules are prepared from aluminum tubing 0.10 inches in diameter and having a wall thickness of .002 inches. The tubing is filled with tetranitromethane, cut into 0.30 inch lengths with a crimping tool and the ends of these lengths are sealed by dipping them into epoxy cement. A truncated conical end burning grain is prepared utilizing the capsules, the ultimate composition of the grain being as follows:

Continuous phase:
  Polyester _____ 20.2
  Ammonium perchlorate _____ 28.6
  Curing agent _____ 3.2
Capsules:
  Aluminum _____ 9.8
  Tetranitromethane _____ 38.2

The inital $K_n$ (ratio of propellant burning surface to nozzle throat area) is 180. Most of the capsules are consumed during firing but the pressure developed is rather low.

EXAMPLE 6

Internal burning cored cylindrical propellant grains containing drawn and capped capsules.

The capsules are of the type disclosed in FIGS. III—VI of the drawings and in the accompanying descriptive matter in the specification. Several of these grains are prepared and fired, the data being summarized in the following table:

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

We claim:

1. A solid composite propellant grain for rocket motors comprising a binder selected from the class consisting of a rubber and a non-brittle resin and, integrally bound in said binder, a multiplicity of individual impermeable metal walled macrocapsules, the contents of said macrocapsules being selected from the class consisting of propellant oxidizers and propellant fuels, the metal walls of said macrocapsules being selected from the class consisting of aluminum, magnesium, zirconium and beryllium.

2. The product of claim 1 wherein the external walls of the capsules comprise aluminum.

3. The product of claim 1 wherein the macrocapsules contain a propellant oxidizer.

4. The product of claim 3 wherein the macrocapsules contain tetranitromethane.

5. The product of claim 3 wherein the macrocapsules contain ammonium perchlorate.

6. The product of claim 3 wherein the macrocapsules contain nitronium perchlorate.

7. The product of claim 1 wherein the walls of said macrocapsules are from about .002 to .005 inch in thickness, said macrocapsules having an internal volume to wall volume not less than about 10:1.

8. The product of claim 1 wherein the macrocapsules are packed in contact with one another, the binder making up not more than about 20 percent of the total grain weight.

9. The product of claim 1 wherein the macrocapsules are separated from one another by the binder.

10. The product of claim 1 wherein the macrocapsules contain a metal powder selected from the class consisting of aluminum powder, magnesium powder, zirconium powder and beryllium powder and a propellant oxidizer.

11. The product of claim 10 wherein the macrocapsules contain aluminum powder and nitronium perchlorate, the metal walls of said macrocapsules being aluminum.

12. The product of claim 10 wherein the macrocapsules contain aluminum powder and ammonium perchlorate, the metal walls of said macrocapsules being aluminum.

13. The product of claim 1 wherein the macrocapsules contain hydrazine, the metal walls of said macrocapsules being aluminum.

14. The product of claim 1 wherein the binder contains ammonium perchlorate.

| | Continuous phase | | Capsules | | | |
|---|---|---|---|---|---|---|
| | Composition, percent | Total weight, grams | Contents | Total weight, grams | Initial, $K_n$ | Maximum pressure, p.s.i.a. |
| Grain designation: | | | | | | |
| 6a | NH₄ClO₄, 60.0<br>Polyester, 22.4<br>TEGDN,[1] 7.0<br>Al (powdered), 5.0<br>Curing agent, 5.6 | 357.9 | Control (No capsules) | | 384 | 1,149 |
| 6b | do | 198 | TNM [2] | 155 | 332 | 1,199 |
| 6c | do | 153 | TNM [2] | 145 | 360 | 5,080 |
| 6d | NH₄ClO₄, 60.0<br>Polyester, 16.8<br>TEGDN,[1] 14.0<br>Al (powdered), 5.0<br>Curing agent, 4.2 | 178 | TNM [2] | 159 | 340 | 9,450 |

[1] Triethylene glycol dinitrate.
[2] Tetranitromethane.